(12) United States Patent
Nomura et al.

(10) Patent No.: US 6,800,270 B2
(45) Date of Patent: Oct. 5, 2004

(54) METHOD OF PRODUCTION OF DIELECTRIC CERAMIC COMPOSITION AND METHOD OF PRODUCTION OF ELECTRONIC DEVICE CONTAINING DIELECTRIC LAYERS

(75) Inventors: Takeshi Nomura, Tokyo (JP); Shigeki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 231 days.

(21) Appl. No.: 09/932,023

(22) Filed: Aug. 20, 2001

(65) Prior Publication Data

US 2002/0041061 A1 Apr. 11, 2002

(30) Foreign Application Priority Data

Aug. 21, 2000 (JP) ......................... 2000-250156

(51) Int. Cl.$^7$ ............... C01G 23/00; H01G 9/00; C03B 29/00
(52) U.S. Cl. ............. 423/598; 29/25.03; 156/89.16; 264/615
(58) Field of Search ............... 264/614, 615, 264/661, 666; 156/89.16; 423/598, 278; 361/321.4, 321.2; 29/25.03

(56) References Cited

U.S. PATENT DOCUMENTS

| | | |
|---|---|---|
| 4,642,732 A | 2/1987 | Ikeda et al. |
| 5,296,425 A | 3/1994 | Chazono et al. |
| 5,835,339 A | 11/1998 | Sakamoto et al. |
| 6,226,172 B1 | 5/2001 | Sato et al. |
| 6,485,672 B1 | 11/2002 | Nomura et al. |

FOREIGN PATENT DOCUMENTS

| | | |
|---|---|---|
| EP | 0 977 218 A | 2/2000 |
| EP | 1 096 518 A | 5/2001 |
| JP | A 6-5460 | 1/1994 |
| JP | A 6-215979 | 8/1994 |
| JP | B2 7-118431 | 12/1995 |
| JP | 09-315861 | 12/1997 |
| JP | 10-279353 | 10/1998 |
| WO | WO 00/51147 | 8/2000 |

*Primary Examiner*—Christopher A. Fiorilla
(74) *Attorney, Agent, or Firm*—Olif & Berridge, PLC

(57) ABSTRACT

A method of production of a dielectric ceramic composition having at least a main component of $Ba_2TiO_3$, a second subcomponent including at least one compound selected from $SiO_2$, MO (where M is at least one element selected from Ba, Ca, Sr, and Mg), $Li_2O$, and $B_2O_3$, and other subcomponents, comprising the step of: mixing in said main component at least part of other subcomponents except for said second subcomponent to prepare a pre-calcination powder, calcining the pre-calcination powder to prepare a calcined powder, and mixing at least said second subcomponent in said calcined powder to obtain the dielectric ceramic composition having molar ratios of the subcomponents to the main component of predetermined ratios. As the other subcomponents, there is a third subcomponent including at least one compound selected from $V_2O_5$, $MoO_3$, and $WO_3$. A ratio of the third subcomponent to 100 moles of the main component is preferably 0.01 to 0.1 mole.

22 Claims, 1 Drawing Sheet

METHOD OF PRODUCTION OF DIELECTRIC CERAMIC COMPOSITION AND METHOD OF PRODUCTION OF ELECTRONIC DEVICE CONTAINING DIELECTRIC LAYERS

BACKGROUND OF THE INVENTION

1. Field of the Invention

The present invention relates to a method of production of a dielectric ceramic composition and a method of production of an electronic device containing dielectric layers such as a multilayer ceramic capacitor.

2. Description of the Related Art

A multilayer ceramic capacitor is broadly used as a compact, large capacity, high reliability electronic device. A large number are used in electrical equipment and electronics. In recent years, along with the reduction in size and improvement in performance of such equipment, increasingly tough demands are being made for further reduction of size, increase of capacity, lowering of price, and improvement of reliability of such multilayer ceramic capacitors.

A multilayer ceramic capacitor is normally produced by stacking and firing a paste of internal electrodes and a slurry of a dielectric (paste) by the sheet method or printing method. In general, Pd or Pd alloy had been used for such internal electrodes, but Pd is high in price, so relatively inexpensive Ni or Ni alloy is now being used. When forming the internal electrodes by Ni or an Ni alloy, however, if firing in the atmosphere, there is the problem that the electrodes end up oxidizing. Therefore, in general, after the binder is removed, firing is performed at an oxygen partial pressure lower than the equilibrium oxygen partial pressure of Ni and NiO, then the dielectric layers are reoxidized by heat treatment (Japanese Unexamined Patent Publication (Kokai) No. 3-113116 and Japanese Patent No. 2787746).

If firing in a reducing atmosphere, however, the dielectric layers are reduced and the specific resistance ends up becoming smaller. Therefore, a reduction resistant dielectric material which is not reduced even if fired in a reducing atmosphere has been proposed (I. Burn et al., "High Resistivity $BaTiO_3$ Ceramics Sintered in $CO-CO_2$ Atmospheres", J. Mater. Sci., 10, 633 (1975); Y. Sakabe et al., "High-Dielectric Constant Ceramics for Base Metal Monolithic Capacitors", pn J. Appl. Phys., 20 Supple. 20-4, 147 (1981)).

A multilayer ceramic capacitor using such reduction resistant dielectric materials, however, suffers from the problem of a short high temperature accelerated lifetime of the insulation resistance (IR) and a low reliability. Further, it suffers from the problem that the specific dielectric constant of the dielectric falls along with time. This is particularly remarkable under a DC electric field. If the thickness of the dielectric layers is reduced to make the multilayer ceramic capacitor smaller in size and larger in capacity, the strength of the electric field applied to the dielectric layers when applying a DC voltage becomes larger. Therefore, the change in the specific dielectric constant becomes remarkably larger.

In the standard known as the X7R characteristic set in the EIA standard, the rate of change of the capacity is set within ±15% between −55° C. to 125° C. (reference temperature of 25° C.). As a dielectric material satisfying the X7R characteristic, for example, the $BaTiO_3+SrTiO_3+MnO$-based composition disclosed in Japanese Unexamined Patent Publication (Kokai) No. 61-36170 is known. This composition, however, changes a large degree in capacity along with time under a DC electric field. For example, if a DC electric field of 50 V is applied at 40° C. for 1000 hours, the rate of change of the capacity ends up becoming about −10 to −30% or so and therefore the X7R characteristic can no longer be satisfied.

Further, in the standard called the "B characteristic", that is, the temperature characteristic of the capacity (EIAJ standard), the rate of change is set to within ±10% between −25 to 85° C. (reference temperature of 20° C.).

Further, as other reduction resistant dielectric ceramic compositions, the $BaTiO_3+MnO+MgO$ disclosed in Japanese Unexamined Patent Publication (Kokai) No. 57-71866, the $(Ba_{1-x}Sr_xO)_aTi_{1-y}Zr_yO_2+\alpha((1-z)MnO+zCoO)+\beta(1-t)A_2O_5+tL_2O_3)+wSiO_2$ (where A=Nb, Ta, V; L=Y or a rare earth element) disclosed in Japanese Unexamined Patent Publication (Kokai) No. 61-250905, the barium titanate adding $Ba_aCa_{1-a}SiO_3$ disclosed in Japanese Unexamined Patent Publication (Kokai) No. 2-83256, etc. may be mentioned.

However, even with these dielectric ceramic compositions, if the thickness of the dielectric layers is a superthin one of for example less than 4 µm, it is extremely difficult to satisfy all of the properties of the temperature characteristic of the capacity, the change in capacity along with time under a DC electric field, the accelerated lifetime of the insulation resistance, and the drop in capacity under a DC bias. For example, in the compositions disclosed in Japanese Unexamined Patent Publication (Kokai) No. 61-250905 and Japanese Unexamined Patent Publication (Kokai) No. 2-83256, the problem arises of a short accelerated lifetime of the insulation resistance and a large drop in capacity under a DC bias.

SUMMARY OF THE INVENTION

An object of the present invention is to provide a method of production for obtaining a multilayer ceramic capacitor or other electronic device containing dielectric layers able to satisfy all of the temperature characteristics of capacity, that is, the X7R characteristic (EIA standard) and B characteristic (EIAJ standard), even when the dielectric layers are superthin layers and having a small change in capacity along with time under a DC electric field, a long accelerated lifetime of the insulation resistance, and small drop in capacity under a DC bias. Another object of the present invention is to provide a method of production of a dielectric ceramic composition able to be suitably used as a dielectric layer of a multilayer ceramic capacitor or other electronic device containing dielectric layers having such superior properties.

To achieve the first object, according to a first aspect of the present invention, there is provided a method of production of a dielectric ceramic composition having at least a main component expressed by a formula $Ba_mTiO_{2+n}$, wherein m is $0.995 \leq m \leq 1.010$, n is $0.995 \leq n \leq 1.010$, and the ratio of Ba and Ti is $0.995 \leq Ba/Ti \leq 1.010$, a first subcomponent containing at least one compound selected from MgO, CaO, BaO, SrO, and $Cr_2O_3$, a second subcomponent containing at least one compound selected from $SiO_2$, MO (where M is at least one element selected from Ba, Ca, Sr, and Mg), $Li_2O$, and $B_2O_3$, a third subcomponent containing at least one compound selected from $V_2O_5$, $MoO_3$, and $WO_3$, and a fourth subcomponent containing an oxide of R (where R is at least one element selected from Y, Dy, Td, Gd, and Ho), wherein the ratio of the subcomponents with respect to 100 moles of the main component is first subcomponent: 0.1 to 3 moles, second subcomponent: 2 to 12 moles, third subcomponent: 0.01 to 3 moles, fourth subcomponent: 0.1 to 10.0 moles (where, the number of moles of the fourth subcomponent is a ratio of R alone), said method of producing the dielectric ceramic composition comprising the step of:

mixing in said main component at least part of other subcomponents except for said second subcomponent to prepare a pre-calcination powder, calcining the pre-calcination powder to prepare a calcined powder, and mixing at least said second subcomponent in said calcined powder to obtain the dielectric ceramic composition having molar ratios of the subcomponents to the main component of the above ratios.

In the method of the present invention, preferably a dielectric ceramic composition further containing a fifth subcomponent containing MnO and having a ratio of the fifth subcomponent to 100 moles of the main component of 0.05 to 1.0 mole is obtained.

Preferably, a dielectric ceramic composition having a molar ratio of the third subcomponent to 100 moles of the main component of 0.01 to 0.1 mole, more preferably 0.01 to less than 0.1 mole, is obtained.

In the present invention, more preferably, the second subcomponent is expressed by $(Ba,Ca)_xSiO_{2+x}$ (where $x=0.7$ to 1.2). The second subcomponent is considered to function as a sintering aid.

When the second subcomponent has a composition expressed by $(Ba,Ca)_xSiO_{2+x}$ (where $x=0.7$ to 1.2), the ratio of Ba and Ca in the second subcomponent may be any ratio. Inclusion of only one is also possible.

Note that in the specification, the oxides comprising the main component and the subcomponents are expressed by stoichiochemical compositions, but the states of oxidation of the oxides may also deviate from the stoichemical compositions. The above ratios of the subcomponents are found by conversion from the amounts of metals contained in the oxides comprising the subcomponents to the oxides of the above stoichiochemical compositions. Further, as the powder materials of the dielectric ceramic composition, it is possible to use the above oxides or their mixtures or composite oxides, but it is also possible to suitably select and mix various compounds forming the above oxides or composite oxides upon firing, such as carbonates, oxalates, nitrates, hydroxides, and organic metal compounds.

In the present invention, a mean particle size of the main component is not particularly limited, but preferably is 0.1 to 0.7 µm, more preferably 0.2 to 0.7 µm.

In the present invention, preferably, the pre-calcination powder is prepared so that the molar ratios of components contained in the pre-calcination powder (Ba+metal element of the first subcomponent)/(Ti+metal element of the fourth subcomponent) is less than 1, or (Ba+metal element of the fourth subcomponent)/(Ti+metal element of the first subcomponent) is over 1, and calcination is performed.

In the present invention, preferably, the first subcomponent is always contained in the pre-calcination powder when preparing the pre-calcination powder.

In the present invention, when the pre-calcination powder contains the material of the fourth subcomponent, the calcination temperature is preferably 500° C. to less than 1200° C., more preferably 600 to 900° C. Further, when the pre-calcination powder does not contain the material of the fourth subcomponent, the calcination temperature is preferably 600 to 1300° C., more preferably 900 to 1300° C., particularly preferably 1000 to 1200° C.

Note that the calcination may also be performed for a plurality of times.

The calcined powder should have at least the second subcomponent mixed in it. If necessary, it is possible to further mix in at least one of the main component, first subcomponent, third subcomponent, fourth subcomponent, and fifth subcomponent in accordance with need. It is sufficient that the composition of the dielectric ceramic composition finally obtained become the above range.

To achieve the second object, according to a second aspect of the present invention, there is provided a method of production of a multilayer ceramic capacitor comprised by alternately stacking interal electrodes comprised of Ni or Ni alloy and dielectric layers, where each of dielectric layers contains, in the molar ratios indicated, $BaTiO_3$: 100 moles, at least one of MgO and CaO: 0.1 to 3 moles, MnO: 0.05 to 1.0 mole, $Y_2O_3$: 0.1 to 5 moles, $V_2O_5$: 0.01 to 3 moles, and $Ba_aCa_{1-a}SiO_3$ (where the symbol (a) is a number from 0 to 1): 2 to 12 moles, characterized by using at least 70 wt % of the material, which is premixed in $BaTiO_3$ at least one of MgO, CaO and a compound forming MgO or CaO upon heat treatment, and pre-calcined at a temperature of 900° C. to 1300° C., with respect to the entire dielectric material.

To achieve the second object, according to a third aspect of the present invention, there is provided a method of production of a multilayer ceramic capacitor comprised by alternately stacking interal electrodes comprised of Ni or Ni alloy and dielectric layers, where each of dielectric layers contains, in the molar ratios indicated, $BaTiO_3$: 100 moles, at least one of MgO and CaO: 0.1 to 3 moles, MnO: 0.05 to 1.0 mole, $Y_2O_3$: 0.1 to 5 moles, $V_2O_5$: 0.01 to 3 moles, and $Ba_aCa_{1-a}SiO_3$ (where the symbol (a) is a number from 0 to 1): 2 to 12 moles, characterized by using at least 70 wt % of the material, which is premixed in $BaTiO_3$ at least one of MgO, CaO and a compound forming MgO or CaO upon heat treatment, MnO or a compound forming MnO upon heat treatment, $Y_2O_3$ or a compound forming $Y_2O_3$ upon heat treatment, and $V_2O_5$ or a compound forming $V_2O_5$ upon heat treatment, and pre-calcined at a temperature of 900° C. to 1300° C., with respect to the entire dielectric material.

In the second and third aspects of the present invention, the molar ratio of the $V_2O_5$ to 100 moles of the $BaTiO_3$ is preferably 0.01 to 0.1 mole, more preferably 0.01 to less than 0.1 mole. Further, in the second and third aspects of the present invention, a mean particle size of the $BaTiO_3$ is preferably 0.2 to 0.7 µm. Note that in the second and third aspects of the present invention, the number of moles of $Y_2O_3$ is the number of moles of $Y_2O_3$ not the number of moles of Y alone.

In the method of production of a conventional dielectric ceramic composition, the $Ba_mTiO_{2+n}$ and the additives are mixed once to prepare the mixed powder or dielectric paste of the dielectric ceramic composition. With the conventional method, however, segregation of the additives (first to fifth subcomponents) etc. occurs in the dielectric ceramic composition after firing and variations end up occurring in the composition between crystals. Due to this segregation, the dielectric constant and the insulation resistance of the dielectric deteriorate.

According to the present invention, by mixing in the main component at least one of the first subcomponent, third subcomponent, fourth subcomponent, and fifth subcomponent, and calcining, leaving aside the second subcomponent, it is possible to suppress variations in the composition between the crystal grains and as a result to suppress the precipitation of the segregation phase and control the size of the segregation phase. Therefore, according to the present invention, it is possible to produce a dielectric ceramic composition suitable for use for a multilayer ceramic capacitor or other electronic device including dielectric layers satisfying both the X7R characteristic and B characteristic, having little change in the capacity under a DC electric field along with time, having a long accelerated lifetime of the insulation resistance, having a small drop in capacity under a DC electric field, and superior in reliability. This was first discovered by the present inventors.

Further, the dielectric ceramic composition obtained by the method of production of the present invention does not contain an element like Pb, Bi, or Zn which evaporates and scatters, so can be fired even in a reducing atmosphere. Therefore, it becomes possible to use a base metal such as Ni or an Ni alloy as the internal electrodes and possible to reduce the cost.

Further, the dielectric ceramic composition obtained by the method of production according to the present invention satisfies the X7R characteristic and the B characteristic, has little deterioration of the aging characteristic of the capacity and insulation resistance due to application of a DC electric field, and is superior in reliability even in firing under a reducing atmosphere. Therefore, the method of the present invention can be expected to be effective as a technique for suppressing deterioration of the rate of change of temperature of the high temperature region accompanying the increased thinness of multilayer capacitors.

Further, the dielectric ceramic composition obtained by the method of production does not contain Pb, Bi, or other substance, so a product with a small detrimental impact on the environment due to dumping, disposal, etc. after use can be provided.

Further, with the method of production according to the present invention, it is possible to realize a dielectric ceramic composition of a uniform composition with little different phases formed by precipitation of the additives and possible to improve the dielectric constant and insulation resistance of the dielectric ceramic composition. Further, with the method of production of the present invention, it is possible to prevent structural defects occurring incidentally, so it is possible to provide a multilayer ceramic capacitor having a high reliability.

Since it is possible to suppress precipitation of different phases without changing the additive composition, it is possible to easily produce a multilayer ceramic capacitor or other electronic device containing dielectric layers having a capacity-temperature characteristic satisfying the X7R characteristic and B characteristic.

In particular, in the present invention, by making the ratio of the third subcomponent to 100 moles of the main component preferably 0.01 to 0.1 mole, more preferably 0.01 to less than 0.1 mole, the insulation resistance (IR), CR product (product of the dielectric constant and the insulation resistance), breakdown voltage (VB) characteristic, and resistance to drop in capacity under a DC bias (DC-Bias characteristic) are improved.

The present disclosure relates to subject matter contained in Japanese Patent Application No. 2000-250156, filed on Aug. 21, 2000, the disclosure of which is expressly incorporated herein by reference in its entirety.

BRIEF DESCRIPTION OF THE DRAWINGS

These and other objects and features of the present invention will be explained in further detail with reference to the attached drawing, FIG. 1, which is a sectional view of a multilayer ceramic capacitor according to an embodiment of the present invention.

DESCRIPTION OF THE PREFERRED EMBODIMENTS

Figure 1:
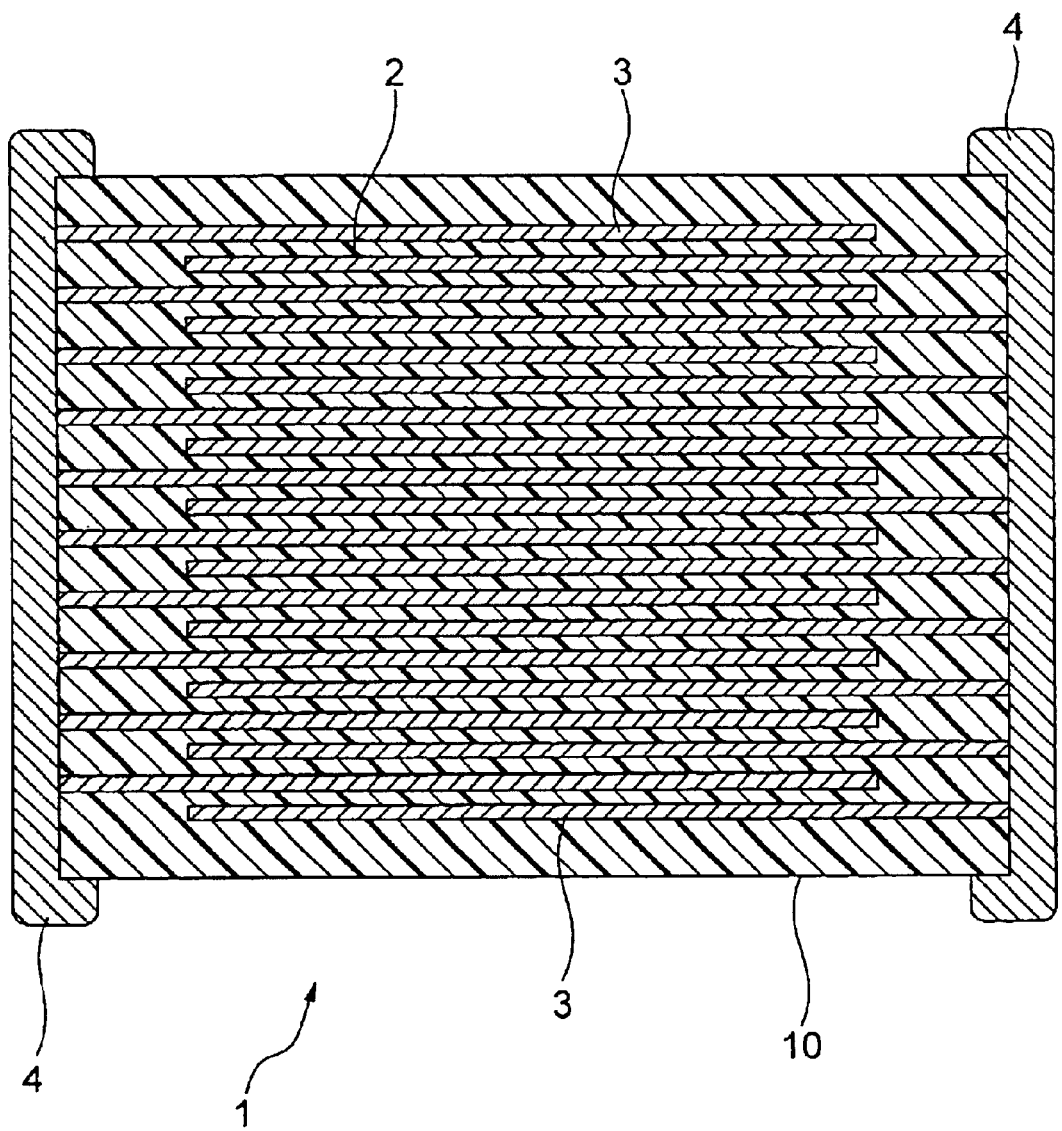

Next, the present invention will be explained based on the embodiment shown in the drawing.

Multilayer Ceramic Capacitor

Before explaining the method of production of a dielectric ceramic composition according to the present invention, an explanation will be made of a multilayer ceramic capacitor.

As shown in FIG. 1, a multilayer ceramic capacitor 1 according to an embodiment of the present invention has a capacitor device body 10 of a configuration of dielectric layers 2 and internal electrode layers 3 stacked alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a parallelopiped. Further, the dimensions are not particularly limited and may be made suitable dimensions in accordance with the application. Usually, however, they are (0.6 to 5.6 mm, preferably 0.6 to 3.2 mm)×(0.3 to 5.0 mm, preferably 0.3 to 1.6 mm)×(0.3 to 1.9 mm, preferably 0.3 to 1.6 mm).

The internal electrode layers 3 are stacked so that end faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3 to form a capacitor circuit.

Dielectric Layers 2

Each of the dielectric layers 2 contains the dielectric ceramic composition obtained by the method of production of the present invention.

The dielectric ceramic composition obtained by the method of production of the present invention is comprised of a dielectric ceramic composition having at least a main component expressed by the formula $Ba_mTiO_{2+n}$ wherein m in the formula is $0.995 \leq m \leq 1.010$, n is $0.995 \leq n \leq 1.010$, and the ratio of Ba and Ti is $0.995 \leq Ba/Ti \leq 1.010$, a first subcomponent including at least one compound selected from MgO, CaO, BaO, SrO, and $Cr_2O_3$, a second subcomponent including at least one compound selected from $SiO_2$, MO (where M is at least one type of element selected from Ba, Ca, Sr, and Mg), $Li_2O$, and $B_2O_3$, a third subcomponent including at least one compound selected from $V_2O_5$, $MoO_3$, and $WO_3$, and a fourth subcomponent including an oxide of R (wherein R is at least one element selected from Y, Dy, Tb, Gd, and Ho).

The ratios of the subcomponents to the main component are, with respect to 100 moles of the main component, First subcomponent: 0.1 to 3 moles,
Second subcomponent: 2 to 12 moles,
Third subcomponent: 0.01 to 3 moles,
Fourth subcomponent: 0.1 to 10.0 moles, preferably
First subcomponent: 0.5 to 2.5 moles,
Second subcomponent: 2.0 to 5.0 moles,
Third subcomponent: 0.01 to 0.1 mole (0.01 to less than 0.1 mole),
Fourth subcomponent: 0.5 to 5.0 moles.

Note that the ratio of the fourth subcomponent is the molar ratio of R alone, not the molar ratio of the R oxide. That is, this means that, when using for example an oxide of Y as the fourth subcomponent, the ratio of $Y_2O_3$ is not 1 mole, but the ratio of Y is 1 mole.

In this specification, the oxides comprising the main component and the subcomponents are expressed by stoichiochemical compositions, but the states of oxidation of the oxides may also deviate from the stoichemical compositions. The above ratios of the subcomponents are found by conversion from the amounts of metals contained in the oxides comprising the subcomponents to the oxides of the above stoichiochemical compositions. Further, as the powder materials of the dielectric ceramic composition, it is possible to use the above oxides or their mixtures or composite oxides, but it is also possible to suitably select and mix various compounds giving the above oxides or composite oxides upon firing, such as carbonates, oxalates, nitrates, hydroxides, and organic metal compounds.

The reasons for limitation of the contents of the subcomponents are as follows:

If the content of the first subcomponent (MgO, CaO, BaO, SrO, and $Cr_2O_3$) is too small, the effect of suppression of the drop in capacity under a DC bias tends to become insufficient. On the other hand, if the content is too large, the drop in the dielectric constant tends to become remarkable and the accelerated lifetime of the insulation resistance tends to become shorter. Note that the ratios of the oxides in the first subcomponent may be any ratios.

If the content of the second subcomponent is too small, the sinterability becomes poor, the accelerated lifetime of the insulation resistance becomes short, and the temperature characteristic of the capacity no longer satisfies the standard of the X7R characteristic. On the other hand, if the content is too great, the dielectric constant becomes low, the capacity falls, and the accelerated lifetime of the insulation resistance also becomes shorter.

The second subcomponent mainly acts as a sintering aid, but also has the effect of reducing the defect rate of the initial insulation resistance when making the dielectric layers thinner.

Preferably, the second subcomponent is expressed by $(Ba,Ca)_xSiO_{2+x}$ (where, x=0.7 to 1.2). The BaO and the CaO in the $[(Ba,Ca)_xSiO_{2+x}]$ of a more preferable embodiment of the second subcomponent are also contained in the first subcomponent, but the composite oxide $(Ba,Ca)_xSiO_{2+x}$ has a low melting point, so the reactivity with respect to the main component is good. In the present invention, it is preferable to add BaO and/or CaO as the above composite oxides. The x in the $(Ba,Ca)_xSiO_{2+x}$ of the more preferable embodiment of the second subcomponent is preferably 0.7 to 1.2, more preferably 0.8 to 1.1. If x is too small, that is, if $SiO_2$ is too great, it reacts with the main component $BaTiO_3$ and ends up causing the dielectric property to deteriorate. On the other hand, if x is too large, the melting point becomes higher and the sinterability is deteriorated, so this is not preferred. Note that the ratio of Ba and Ca may be any ratio. It is also possible to include only one.

If the content of the third subcomponent ($V_2O_5$, $MoO_3$, or $WO_3$) is too small, the IR lifetime under a DC electric field falls and the temperature characteristic of the capacity tends to no longer satisfy the standard of the X7R characteristic. On the other hand, if the content is too large, the initial insulation resistance tends to become lower and the CR product also tends to become lower. Note that the ratios of the oxides in the third subcomponent may be any ratios.

If the content of the fourth subcomponent (R oxide) is too small, the accelerated lifetime of the insulation resistance tends to become shorter. On the other hand, if the content is too large, the sinterability tends to deteriorate. Among these, from the viewpoint of satisfying the X7R characteristic, among the fourth subcomponents, a Y oxide, Dy oxide, or Ho oxide is preferable. In particular, since the effect of improving the properties is high and the cost is low, a Y oxide is preferable.

The dielectric ceramic composition of the present invention may also contain, in accordance with need, MnO as a fifth subcomponent. The fifth subcomponent exhibits the effect of promotion of sintering and the effect of reduction of the dielectric loss (tans). To sufficiently obtain such an effect, it is preferable that the ratio of the fifth subcomponent to 100 moles of the main component be at least 0.05 mole. If the content of the fifth subcomponent is too large, however, a detrimental effect is given to the capacity-temperature characteristic, so the content is preferably made not more than 1.0 mole.

Further, the dielectric ceramic composition of the present invention may also contain, in addition to the above oxides, $Al_2O_3$. $Al_2O_3$ does not have much of an effect on the capacity-temperature characteristic and has the effect of improvement of the sinterability, insulation resistance, and accelerated lifetime (IR lifetime) of the insulation resistance. If the content of the $Al_2O_3$ is too large, however, the sinterability deteriorates and the IR falls, so the $Al_2O_3$ is preferably not more than 1 mole with respect to 100 moles of the main component, preferably not more than 1 mole of the dielectric ceramic composition as a whole.

Note that when at least one of Sr, Zr, and Sn replaces the Ba or Ti in the main component forming the perovskite structure, the Curie temperature shifts to the low temperature side, so the capacity-temperature characteristic over 125° C. deteriorates. Therefore, it is preferable not to use $Ba_mTiO_{2+n}$ containing these elements [for example, $(Ba,Sr)TiO_3$] as the main component. However, there is no particular problem at the level of content as an impurity (not more than about 0.1 mol % of the dielectric ceramic composition as a whole).

The mean particle size of the dielectric ceramic composition of the present invention is not particularly limited and may be suitably determined in accordance with the thickness of the dielectric layer, for example, from the range of 0.1 to 3.0 $\mu$m, preferably 0.1 to 0.7 $\mu$m. The capacity-temperature characteristic deteriorates the thinner the dielectric layers and tends to deteriorate the smaller the mean crystal grain size. Therefore, the dielectric ceramic composition of the present invention is particularly effective when it is necessary to reduce the mean crystal grain size, specifically when the mean crystal grain size is 0.1 to 0.5 $\mu$m. Further, if the mean crystal grain size is reduced, the IR lifetime becomes longer and the change of the capacity along with time under a DC bias becomes smaller, so from this viewpoint as well, the mean crystal grain size is preferably small as explained above.

A dielectric layer of the present invention is configured by grains, grain boundaries, and grain boundary phases. Further, it may also be configured by a composition having a so-called core-shell structure.

Note that the thickness, number of layers, and other various conditions of the dielectric layers comprised of the dielectric ceramic composition of the present invention may be suitably determined in accordance with the object and application. For example, the thickness of the dielectric layers is normally not more than 50 μm per layer, particularly not more than 10 μm. The lower limit of the thickness is usually about 1 μm. The dielectric ceramic composition of the present invention is effective in improving the capacity-temperature characteristic of a multilayer ceramic capacitor having such thinner dielectric layers. Note that the number of the dielectric layers is normally 2 to 400, preferably 10 to 400 or so.

The multilayer ceramic capacitor used in the dielectric ceramic composition of the present invention is suitably used as an electronic device for equipment used in an environment of −55° C. to +125° C. Further, in this temperature range, the capacity-temperature characteristic can satisfy the X7R characteristic of the EIA standard (within ΔC=±15% at 55 to 125° C.) and simultaneously satisfy the B characteristic of the EIAJ standard [rate of change of capacity within ±10% at −25 to 85° C. (reference temperature 20° C.)].

In the multilayer ceramic capacitor, an AC electrical field of normally at least 0.02 V/μm, in particular at least 0.2 V/μm, further at least 0.5 V/μm, and in general not more than about 5 V/μm, and, superposed on this, a DC electrical field of not more than 5 V/μm are applied to the dielectric layers, but even if such electrical fields are applied, the temperature characteristic of the capacity is extremely stable.

Internal Electrode Layers 3

The electroconductive material contained in the internal electrode layers 3 is not particularly limited, but a base metal may be used since the material constituting the dielectric layers 2 has resistance to reduction. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %.

Note that the Ni or Ni alloy may contain P and other various types of trace components in amounts of not more than 0.1 wt % or so.

The thickness of the internal electrode layers may be suitably determined in accordance with the application etc., but is usually 0.5 to 5 μm, preferably 0.5 to 2.5 μm, more preferably 1 to 2 μm or so.

External Electrodes 4

The electroconductive material contained in the external electrodes 4 is not particularly limited, but in the present invention, an inexpensive Ni, Cu, or alloys of the same are used.

The thickness of the external electrodes may be suitably determined in accordance with the application etc., but is usually 10 to 100 μm or so.

Method of Manufacturing Multilayer Ceramic Capacitor

The multilayer ceramic capacitor produced using the method of production of a dielectric ceramic composition according to the present invention is produced by preparing a green chip using the usual printing method or sheet method which uses pastes, firing the green chip, then printing or transferring the external electrodes and firing. The method of production will be explained in detail below.

First, the dielectric ceramic composition powder contained in the dielectric layer paste is prepared. The powder of $BaTiO_3$ in the dielectric ceramic composition powder includes not only a powder obtained normally be mixing the materials, then calcining and pulverizing them, that is, the solid phase method, but also powder obtained by the oxalate method or the hydrothermal synthesis method or other so-called liquid phase methods.

In the present invention, calcination is performed before obtaining the dielectric ceramic composition powder of the above composition. That is, a pre-calcination powder is prepared by mixing and drying at least one of the main component ($Ba_mTiO_{2+n}$) and the first subcomponent (for example, MgO or CaO or a compound forming MgO or CaO upon heat treatment), the third subcomponent (for example, $V_2O_5$ or a compound forming $V_2O_5$ upon heat treatment), the fourth subcomponent (for example, $Y_2O_3$ or a compound forming $Y_2O_3$ upon heat treatment), and the fifth subcomponent (for example, MnO or a compound forming MnO upon heat treatment), leaving aside the second subcomponent (for example, $(Ba,Ca)_xSiO_{2+x}$).

Note that as compounds forming MgO or CaO upon heat treatment, $MgCO_3$, $MgCl_2$, $MgSO_4$, $Mg(NO_3)_2$, $Mg(OH)_2$, $(MgCO_3)_4Mg(OH)_2$, $CaCO_3$, $CaCl_2$, $CaSO_4$, $Ca(NO_3)_2$, Mg alkoxide, Ca alkoxide, etc. and hydrates of the same may be illustrated. Further, as compounds forming MnO upon heat treatment, $MnCO_3$, $MnCl_2$, $MnSO_4$, $Mn(NO_3)_2$, and hydrates of the same may be illustrated. Further, as compounds forming $Y_2O_3$ upon heat treatment, $YCl_3$, $Y_2(SO_4)_3$, $Y(NO_3)_3$, $Y(CH_3COO)_3$, Y alkoxide, and hydrates of the same may be illustrated. Further, as compounds forming $V_2O_5$ upon heat treatment, $VCl_5$, $V_2(SO_4)_5$, $V(NO_3)_5$, etc. or hydrates of the same may be illustrated.

The pre-calcination powder is calcined in the following way. The calcination conditions are not particularly limited, but preferably the calcination is performed under the conditions shown below:

Rate of temperature rise: 50 to 400° C./hour, in particular 100 to 300° C./hour

Holding temperature: 500 to 1300° C., preferably 500° C. to less than 1200° C.

Temperature holding time: 0.5 hour to 6 hours, in particular 1 to 3 hours

Atmosphere: Air and nitrogen

The calcined powder is roughly pulverized by an alumina roll etc., then at least the second subcomponent (for example, $(Ba,Ca)_xSiO_{2+x}$) is added, then, in accordance with need, the remaining additives are added to prepare the mixed powder of the final composition. Next, the mixed powder is mixed by a ball mill etc. and dried according to need to obtain a dielectric ceramic composition powder having the composition of the present invention.

The molar ratios of the components in the calcined powder are not particularly limited, but preferably satisfy the following relation. That is, it is preferable that (Ba+metal element of first subcomponent)/(Ti+metal element of fourth subcomponent) be less than 1 and that (Ba+metal element of fourth subcomponent)/(Ti+metal element of first subcomponent) be over 1. If in this range, the accelerated lifetime of the insulation resistance is particularly improved.

Further, the calcined powder preferably always contains the first subcomponent. The calcined powder preferably contain 30 wt %, more preferably 50 wt %, of the first subcomponent when the total weight of the first subcomponent in the final composition powder is 100 wt %.

The calcined powder is mixed with the later added components in an amount of preferably at least 60 wt %, more preferably at least 70 wt %, particularly preferably at least 80 wt %, with respect to the finally obtained dielectric ceramic composition powder as 100 wt %. If the ratio of the calcined powder is too small, the effect of the present invention tends to become small.

Next, the finally obtained dielectric ceramic composition powder is made to a coating to prepare a dielectric layer paste. The dielectric layer paste may be an organic-based coating obtained by kneading the dielectric ceramic composition powder with an organic vehicle or may be a water-based coating.

In the state before coating, the particle size of the dielectric ceramic composition powder is normally a mean particle size of 0.1 to 3 µm, preferably 0.1 to 0.7 µm or so.

The organic vehicle is comprised of a binder dissolved in an organic solvent. The binder used for the organic vehicle is not particularly limited, but may be suitably selected from ethyl cellulose, polyvinyl butyrate, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, when the dielectric layer paste is made a water-based coating, if it sufficient to knead a water-based vehicle comprised of a water-soluble binder, dispersant, etc. dissolved in water with the dielectric material. The water-soluble binder used in the organic vehicle is not particularly limited. For example, a polyvinyl alcohol, cellulose, water-based acrylic resin, etc. may be used.

The internal electrode layer paste is prepared by kneading the electroconductive material comprised of the above various types of electroconductive metals and alloys or various types of oxides forming the above electroconductive materials after firing, an organometallic compound, resinate, etc. (electroconductive material) together with the above organic vehicle. The electroconductive material in the paste etc. is not particularly limited in shape. Balls, flakes, etc. may be mentioned. Further, these shapes may also be mixed together.

The external electrode paste is prepared in the same way as the internal electrode paste.

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these auxiliary additives is preferably not more than 10 wt %.

Note that as the plasticizer, for example, polyethylene glycol, a phthalic acid ester (for example, dioctyl phthalate, dibutyl phthalate), etc. may be used. Further, as the dispersant, for example, oleic acid, a rosin, glyceryl, octadecylamine, an oleic acid ethyl, a mencedene oil, etc. may be used.

In particular, when preparing a dielectric layer paste (slurry), the content of the dielectric ceramic composition powder in the paste is preferably made about 50 to 80 wt % with respect to the paste as a whole, while the content of the binder is preferably made 2 to 5 wt %, the plasticizer 0.1 to 5 wt %, the dispersant 0.1 to 5 wt %, and the solvent 20 to 50 wt % or so.

When using the printing method, the dielectric layer paste and the internal electrode layer paste are printed on a substrate of PET etc., cut into a predetermined shape, then peeled from the substrate to obtain a green chip.

Further, when using the sheet method, a green sheet is formed using the dielectric layer paste, the internal electrode layer paste is printed on this, then these sheets are stacked to form the green chip.

Before firing, the green chip is processed to remove the binder. The processing for removing the binder may be performed under ordinary conditions, but particularly preferably is performed under the following conditions when using a base metal such as Ni or an Ni alloy for the electroconductive material of the internal electrode layers:

Rate of temperature rise: 50 to 300° C./hour, in particular 10 to 100° C./hour

Holding temperature: 180 to 400° C., in particular 200 to 300° C.

Temperature holding time: 0.5 hour to 24 hours, in particular 5 to 20 hours

Atmosphere: Air

The atmosphere when firing the green chip may be suitably determined in accordance with the type of the electroconductive material in the internal electrode layer paste, but when using a base metal such as Ni or an Ni alloy as the electroconductive material, the oxygen partial pressure in the firing atmosphere is preferably $10^{-7}$ to $10^{-13}$ atm, more preferably $10^{-10}$ to $10^{-12}$. If the oxygen partial pressure is less than that range, the electroconductive material of the internal electrode layers is abnormally sintered and sometimes ends up breaking. Further, if the oxygen partial pressure is over that range, the internal electrode layers tend to oxidize.

Further, the holding temperature at the time of firing is preferably 1100 to 1400° C., more preferably 1150 to 1400° C., still more preferably 1200 to 1300° C. If the holding temperature is less than that range, the densification becomes insufficient, while if over that range, the electrodes break due to abnormal sintering of the internal electrode layers, the capacity-temperature characteristic deteriorates due to diffusion of the materials making up the internal electrode layers, and the dielectric ceramic composition becomes easily reducible.

Preferably, the various conditions at the time of firing other than the above conditions are selected from the following range:

Rate of temperature rise: 100 to 900° C./hour, in particular 200 to 900° C./hour Temperature holding time: 0.5 hour to 8 hours, in particular 1 to 3 hours Cooling rate: 50 to 500° C./hour, in particular 200 to 300° C./hour Note that the firing atmosphere is preferably made a reducing atmosphere. As the atmospheric gas, for example, it is preferable to use a wet mixed gas of $N_2$ and $H_2$.

When firing in a reducing atmosphere, it is preferable to anneal the capacitor device body. The annealing is processing for reoxidizing the dielectric layers and enables the IR lifetime to be remarkably prolonged, so improves the reliability.

The oxygen partial pressure in the annealing atmosphere is preferably made $10^{-4}$ to $10^{-7}$ atm. If the oxygen partial pressure is less than the above range, the reoxidation of the dielectric layers is difficult, while if over the above range, the internal electrode layers tend to oxidize.

The holding temperature at the time of annealing is preferably made not more than 1200° C., particularly 500 to 1200° C. If the holding temperature is less than the above range, the oxidation of the dielectric layers becomes insufficient, so the IR is low or the IR lifetime easily becomes shortened. On the other hand, if the holding temperature is over the above range, not only do the internal electrode layers oxidize and the capacity fall, but also the internal electrode layers end up reacting with the dielectric material resulting in a susceptibility to deterioration of the capacity-temperature characteristic, a drop in the IR, and a drop in the IR lifetime. Note that the annealing may also be comprised of a temperature raising process and a temperature lowering process. That is, the temperature holding time may also be made zero. In this case, the holding temperature is synonymous with the maximum temperature.

The various conditions at the time of annealing other than the above conditions are preferably selected from the following ranges:

Temperature holding time: 0.5 hour to 12 hours, in particular 6 to 10 hours

Cooling rate: 50 to 600° C./hour, in particular 100 to 300° C./hour

Note that the atmospheric gas is preferably wet $N_2$ gas etc.

In the above processing to remove the solvent, firing, and annealing, the $N_2$ gas or the mixed gas etc. may be wet by for example using a wetter etc. In this case, the water temperature is preferably made 5 to 75° C. or so.

The processing to remove the solvent, firing, and annealing may be performed continuously or independently. If these are performed continuously, it is preferable to perform the processing to remove the binder, then change the atmosphere without cooling, then fire by raising the temperature up to the holding temperature at the time of firing, then cool, change the atmosphere when reaching the holding temperature for annealing, and anneal. On the other hand, when performing these independently, at the time of firing, preferably the temperature is raised to the holding temperature of the time of processing to remove the binder in an $N_2$ gas or a wet $N_2$ gas atmosphere, then the atmosphere is changed and the temperature continued to be raised, then preferably the temperature is lowered to the holding temperature of the time of annealing, then the atmosphere is changed again to an $N_2$ gas or wet $N_2$ gas atmosphere and the cooling continued. Further, at the time of annealing, it is also possible to raise the temperature to the holding temperature in an $N_2$ gas atmosphere, then change the atmosphere or conduct the entire annealing process in a wet $N_2$ gas atmosphere.

The thus obtained capacitor device body is, for example, end polished using barrel polishing or sandblasting etc., then printed or transferred with an external electrode paste and fired to form the external electrodes 4. The firing conditions of the external electrode paste are for example preferably 600 to 800° C. for 10 minutes to 1 hour or so in a wet mixed gas of nitrogen and hydrogen. Further, in accordance with need, the surfaces of the external electrodes 4 may be formed with a covering layer by plating etc.

The thus produced multilayer ceramic capacitor of the present invention has a capacity-temperature characteristic satisfying the X7R characteristic of the EIA standard and satisfying the B characteristic of the EIAJ standard even when the thickness of the dielectric layers is a superthin one of not more than 4 $\mu$m. Further, the multilayer ceramic capacitor of the present invention has a small change of the capacity over time under a DC electric field, a long accelerated lifetime of the insulation resistance, and a small drop in capacity under a DC bias.

The thus produced multilayer ceramic capacitor of the present invention is mounted by soldering it onto a printed circuit board for use in various types of electronic equipment.

Note that the present invention is not limited to the above embodiment and may be modified in various ways within the scope of the invention.

For example, the dielectric ceramic composition obtained by the method of production of the present invention is not used only for a multilayer ceramic capacitor and may be used for other electronic devices formed with dielectric layers as well.

Below, the present invention will be explained in further detail with reference to more detailed examples, but the present invention is not limited to these examples.

EXAMPLE 1

Samples A1 to A10 of multilayer ceramic capacitors were prepared by the following routine:

First, the following pastes were prepared.

Dielectric Layer Paste

First, the main component material and the subcomponent materials were prepared. As the main component material, $BaTiO_3$ of a particle size of 0.2 to 0.7 $\mu$m obtained by the hydrothermal synthesis method was used. For the MgO and the MnO materials, carbonates were used, while for the other subcomponent materials, oxides were used. As the magnesium carbonate used as the material of MgO, $(MgCO_3)_4Mg(OH)_2 \cdot 5H_2O$ was used. Further, as the carbonate used as the material of the MnO, $MnCO_3$ was used.

Further, as the material of the second subcomponent, $(Ba_{0.6}Ca_{0.4})SiO_3$ was used. Note that $(Ba_{0.6}Ca_{0.4})SiO_3$ was produced by wet mixing $BaCO_3$, $CaCO_3$, and $SiO_2$ by a ball mill for 16 hours, drying the result, then firing at 1150° C. in the air and then further wet pulverizing the result by a ball mill for 100 hours.

First, the main component, $BaTiO_3$, and the material of the first subcomponent, magnesium carbonate, were mixed and dried to prepare a pre-calcination powder. As shown in Table 1, the pre-calcination powder contained 2.1 moles of magnesium carbonate, converted to MgO, with respect to 100 moles of $BaTiO_3$. Further, when examining the molar ratio of specific components in the pre-calcination powder of (Ba+metal element Mg in the first subcomponent)/(Ti+metal element Y in the fourth subcomponent), as shown in Table 1, it was 1.021. Further, when examining the molar ratio of (Ba+metal element Y in the fourth subcomponent)/(Ti+metal element Mg in the first subcomponent), as shown in Table 1, it was 0.9794.

Next, the pre-calcination powder was calcined. The calcination conditions were as follows:

Rate of temperature rise: 300° C./hours,

Holding temperature (T1 in Table 1): 500 to 1350° C.

Temperature holding time: 3 hours

Atmosphere: Air

The material obtained by the calcination was pulverized by a pulverizer for 1 hour to obtain a calcined powder, then as shown in Table 2, 3.0 moles of $(Ba_{0.6}Ca_{0.4})SiO_3$, 0.375 mole of $MnCO_3$, 0.01 mole of $V_2O_5$, and 2.1 mole of $Y_2O_3$ (number of moles of Y: 4.2 moles, same below) were added to the calcined powder, wet mixed by a zirconia ball mill for 16 hours, then dried to obtained the dielectric ceramic composition powder of the final composition.

100 parts by weight of the thus obtained dielectric ceramic composition powder, 4.8 parts by weight of acrylic resin, 40 parts by weight of methylene chloride, 20 parts by weight of ethyl acetate, 6 parts by weight of mineral spirits, and 4 parts by weight of acetate were mixed by a ball mill for 16 hours to make a paste.

Internal Electrode Layer Paste 44.6 parts by weight of Ni particles of a mean particle size of 0. 4 µm, 52.0 parts by weight of terpineol, 3.0 parts by weight of ethyl cellulose, and 0.4 part by weight of benzotriazole were kneaded by a triple roll to make a paste.

External Electrode Layer Paste 100 parts by weight of Cu particles of a mean particle size of 2 µm, 35 parts by weight of an organic vehicle (8 parts by weight of ethyl cellulose resin dissolved in 92 parts by weight of butyl carbitol), and 7 parts by weight of butyl carbitol were kneaded to make a paste.

Preparation of Green Chip

A green sheet of a thickness of 5 µm was formed on a PET film using the above dielectric layer paste. The internal electrode paste was printed on the surface of the green sheet, then the sheet was peeled off from the PET film. Next, four layers of the green sheet printed with the internal electrode layer paste were stacked with several protective green sheets (sheets not printed with internal electrode layer paste) in between them, then pressed under conditions of 120° C. and 15 Pa to obtain a green chip.

Firing

First, the green chip was cut to a predetermined size, then processed to remove the binder, fired, and annealed under the following condtions, then formed with external electrodes to obtain Samples A1 to A10 of multilayer ceramic capacitors of the configuration shown in FIG. 1.

Conditions of Processing to Remove Binder

Rate of temperature rise: 15° C./hour

Holding temperature: 280° C.

Temperature holding time: 8 hours

Atmosphere: Air

Firing Conditions

Rate of temperature rise: 200° C./hours

Holding temperature: 1270° C.

Temperature holding time: 2 hours

Cooling rate: 300° C./hour

Atmosphere: Wet $N_2+H_2$ mixed gas

Oxygen partial pressure: $10^{-12}$ atm

Annealing Conditions

Holding temperature: 1000° C.

Temperature holding time: 3 hours

Cooling rate: 300° C./hour

Atmosphere: Wet $N_2$ gas

Oxygen partial pressure: $10^{-6}$ atm

Note that for wetting the atmospheric gas at the time of the processing to remove the binder, firing, and annealing, use was made of a wetter with a water temperature of 35° C.

External Electrodes

The external electrodes were formed by polishing the end faces of the fired body by sandblasting, then transferring the above external electrode paste on the end faces and firing in a wet $N_2+H_2$ atmosphere at 800° C. for 10 minutes.

The size of each of the obtained samples was 3.2 mm×1.6 mm×1.4 mm. The number of dielectric layers sandwiched between the internal electrode layers was four, the thickness was 3 µm, and the thickness of the internal electrode layers was 1.3 µm.

Further, disk-shaped samples were also prepared in addition to the samples of the capacitors. The disk-shaped samples had the same compositions as the dielectric layers of the samples of the capacitors and the same firing conditions and had In—Ga electrodes of diameters of 5 mm coated on the two surfaces of the samples.

Each of the samples was evaluated for the following properties:

Specific Dielectric Constant (εr)

The disk-shaped sample was measured for capacity at 25° C. by an LCR meter under conditions of 1 kHz and 1 V rms. The specific dielectric constant was calculated from the capacity, electrode dimensions, and thickness of the sample. The results are shown in Table 2. The higher the specific dielectric constant, the better.

Insulation Resistance (IR)

Each sample of the capacitor was measured for specific resistance at 25° C. The specific resistance was measured by an insulation resistance meter (R8340A (50 V-1 minute value) made by Advantest Co.) The results are shown in Table 2. The higher the insulation resistance, the better. Note that the CR product in Table 2 is the product of the dielectric constant and the insulation resistance. Further, the higher the CR product, the better.

Breakdown Voltage (VB)

The breakdown voltage was found by applying a DC voltage to the sample of the multilayer ceramic capacitor at a speed of voltage rise of 100 V/second and measuring the voltage when a leakage current of 100 mA was observed. The results are shown in Table 2. The higher the breakdown voltage, the better.

IR Lifetime Under DC Electric Field (High Temperature Accelerated Lifetime, shown as HALT in table)

Each sample of the multilayer ceramic capacitor was subjected to an acceleration test at 180° C. under an electric field of 10 V/µm. The time until the insulation resistance (IR) became less than $2\times10^5\Omega$ was used as the lifetime. The results are shown in Table 2. The longer the lifetime, the more improved the durability of the capacitor.

Temperature Characteristic of Capacity (TCC in Table)

Each sample of the multilayer ceramic capacitor was measured for capacity at a temperature range of −55 to 125° C. to examine if the X7R characteristic was satisfied. Note that the measurement was conducted using an LCR meter at a measurement voltage of 1 V. It was examined if the rate of change of the capacity satisfied the requirement of being within +15% (reference temperature of 25° C.). When satisfying it, it was indicated as "Good", while when not satisfying it, it was indicated as "Poor".

For the B characteristic, the capacity was measured by an LCR meter at a measurement voltage of 1 for −25 to 85° C. It was examined if the rate of change of the capacity satisfied the requirement of being within +10% (reference temperature of 20° C.). When satisfying it, it was indicated as "Good", while when not satisfying it, it was indicated as "Poor".

Change of Capacity Over Time Under DC Electric Field

A DC electric field of 2.5 V per 1 µm thickness of the dielectric layer was applied to a sample of the multilayer ceramic capacitor (7.5 V voltage applied to sample) at 40°

C. for 100 hours, then the sample was allowed to stand in a no load state at room temperature for 24 hours and the capacity was measured. The amount of change AC from the capacity $C_0$ before application of the DC electric field (initial capacity) was found and the rate of change $\Delta C/C_0$ was calculated. Note that the capacity was measured under the following conditions.

Resistance to Capacity Drop Under DC Bias (DC-Bias Characteristic)

The electrostatic capacity was measured by an LCR meter at room temperature while applying a DC electric field of 0 to 13 V/μm and the electric field when the capacity under the DC electric field became −50% was found. It is preferable that it be at least 6.3 V/μm, if possible at least 6.5 V/μm.

TABLE 1

| | Composition at time of calcination (mol) | | | | | | | | |
|---|---|---|---|---|---|---|---|---|---|
| Sample No. | Main comp. $BaTiO_3$ | 1st sub-comp. | 3rd sub-comp. $V_2O_5$ | 4th subcomp. R alone/no. of moles | | 5th sub-comp. MnO | Formula (1) | Formula (2) | Cal. temp. T1 (° C.) |
| A1 | 100 | 2.1 | MgO | | | | 1.021 | 0.9794 | 500 |
| A2 | 100 | 2.1 | MgO | | | | 1.021 | 0.9794 | 600 |
| A3 | 100 | 2.1 | MgO | | | | 1.021 | 0.9794 | 700 |
| A4 | 100 | 2.1 | MgO | | | | 1.021 | 0.9794 | 800 |
| A5 | 100 | 2.1 | MgO | | | | 1.021 | 0.9794 | 900 |
| A6 | 100 | 2.1 | MgO | | | | 1.021 | 0.9794 | 1000 |
| A7 | 100 | 2.1 | MgO | | | | 1.021 | 0.9794 | 1100 |
| A8 | 100 | 2.1 | MgO | | | | 1.021 | 0.9794 | 1200 |
| A9 | 100 | 2.1 | MgO | | | | 1.021 | 0.9794 | 1300 |
| A10 | 100 | 2.1 | MgO | | | | 1.021 | 0.9794 | 1350 |
| (Comp. Ex. 1) | | | | | | | | | None |
| B1 | 100 | 2.1 | CaO | | | | 1.021 | 0.9794 | 1000 |
| B2 | 100 | 2.1 | BaO | | | | 1.021 | 0.9794 | 1000 |
| C1 | 100 | 2.1 | MgO | | 4.2 Y | | 0.9798 | 1.0206 | 700 |
| C2 | 100 | 2.1 | MgO | | 4.2 Y | | 0.9798 | 1.0206 | 800 |
| C3 | 100 | 2.1 | MgO | | 4.2 Y | | 0.9798 | 1.0206 | 900 |
| C4 | 100 | 2.1 | MgO | | 4.2 Y | | 0.9798 | 1.0206 | 1000 |
| C5 | 100 | 2.1 | MgO | | 4.2 Y | | 0.9798 | 1.0206 | 1100 |
| C6 | 100 | 2.1 | MgO | | 4.2 Y | 0.375 | 0.9798 | 1.0206 | 700 |
| C7 | 100 | 2.1 | MgO | | 4.2 Y | 0.375 | 0.9798 | 1.0206 | 800 |
| C8 | 100 | 2.1 | MgO | | 4.2 Y | 0.375 | 0.9798 | 1.0206 | 900 |
| C9 | 100 | 2.1 | MgO | | 4.2 Y | 0.375 | 0.9798 | 1.0206 | 1000 |
| C10 | 100 | 2.1 | MgO | | 4.2 Y | 0.375 | 0.9798 | 1.0206 | 1100 |
| D1 | 100 | 2.1 | MgO | 0.01 | 4.2 Y | 0.375 | 0.9798 | 1.0206 | 500 |
| D2 | 100 | 2.1 | MgO | 0.01 | 4.2 Y | 0.375 | 0.9798 | 1.0206 | 600 |
| D3 | 100 | 2.1 | MgO | 0.01 | 4.2 Y | 0.375 | 0.9798 | 1.0206 | 700 |
| D4 | 100 | 2.1 | MgO | 0.01 | 4.2 Y | 0.375 | 0.9798 | 1.0206 | 800 |
| D5 | 100 | 2.1 | MgO | 0.01 | 4.2 Y | 0.375 | 0.9798 | 1.0206 | 900 |
| D6 | 100 | 2.1 | MgO | 0.01 | 4.2 Y | 0.375 | 0.9798 | 1.0206 | 1000 |
| D7 | 100 | 2.1 | MgO | 0.01 | 4.2 Y | 0.375 | 0.9798 | 1.0206 | 1100 |
| D8 | 100 | 2.1 | MgO | 0.01 | 4.2 Y | 0.375 | 0.9798 | 1.0206 | 1200 |
| D9 | 100 | 2.1 | MgO | 0.01 | 4.2 Y | 0.375 | 0.9798 | 1.0206 | 1300 |
| E1 | 100 | 2.1 | MgO | 0.01 | 4.2 Dy | 0.375 | 0.9798 | 1.0206 | 800 |
| E2 | 100 | 2.1 | MgO | 0.01 | 4.2 Ho | 0.375 | 0.9798 | 1.0206 | 800 |
| E3 | 100 | 2.5 | MgO | 0.01 | 3.0 Eu | 0.375 | 0.9951 | 1.0049 | 800 |
| E4 (Comp. Ex.2) | | | | | Gd | | | | None |
| E5 | 100 | 2.5 | MgO | 0.01 | 3.0 Gd | 0.375 | 0.9951 | 1.0049 | 800 |
| E6 (Comp. Ex.3) | | | | | Tb | | | | None |
| E7 | 100 | 2.5 | MgO | 0.01 | 2.8 Tb | 0.375 | 0.9971 | 1.0029 | 800 |

Notes:
The first and fourth subcomponents are calculated as atomic %.
Formula (1): (Ba + first subcomponent)/(Ti + fourth subcomponent)
Formula (2): (Ba + fourth subcomponent)/(Ti + first subcomponent)

TABLE 2

| Sample no. | Main comp. BaTiO₃ | 1st sub-comp. MgO | 4th sub-comp. No. of moles of Y | 5th sub-comp. MnO | 3rd sub-comp. VO₃ | 2nd sub-comp. (BaCa)SiO₃ | TCC ΔC -55 (%) | ΔC +85 (%) | ΔC +125 (%) | B-char. | X7R | HALT (hr) | εr | IR | CR product | Change in capacity over time (t) | DC-bias capacity halving field (V/μm) | VB (V) |
|---|---|---|---|---|---|---|---|---|---|---|---|---|---|---|---|---|---|---|
| A1 | | | 4.2 | 0.375 | 0.01 | 3 | 2.2 | -7.5 | -12.0 | Good | Good | 22.7 | 2370 | 2.3E+13 | 4824.1 | -5.4 | 6.5 | 412 |
| A2 | | | 4.2 | 0.375 | 0.01 | 3 | 1.5 | -7.0 | -10.3 | Good | Good | 23.3 | 2372 | 2.36E+13 | 4828.2 | -5.5 | 6.8 | 422 |
| A3 | | | 4.2 | 0.375 | 0.01 | 3 | 0.8 | -7.3 | 8.8 | Good | Good | 26.5 | 2374 | 2.4E+13 | 5042.4 | -5.1 | 6.6 | 453 |
| A4 | | | 4.2 | 0.375 | 0.01 | 3 | 0.5 | -7.0 | 8.8 | Good | Good | 27.3 | 2374 | 2.4E+13 | 5042 | -4.5 | 7.0 | 464 |
| A5 | | | 4.2 | 0.375 | 0.01 | 3 | 0.3 | -6.9 | 9.9 | Good | Good | 28.8 | 2372 | 2.5E+13 | 5248 | -4.0 | 7.2 | 461 |
| A6 | | | 4.2 | 0.375 | 0.01 | 3 | -0.7 | -7.1 | -10.8 | Good | Good | 31.1 | 2370 | 2.6E+13 | 5453 | -4.0 | 6.8 | 453 |
| A7 | | | 4.2 | 0.375 | 0.01 | 3 | -1.4 | -7.7 | -11.3 | Good | Good | 32.1 | 2368 | 2.6E+13 | 5449 | -3.8 | 6.8 | 437 |
| A8 | | | 4.2 | 0.375 | 0.01 | 3 | -2.3 | -0.3 | -12.6 | Good | Good | 30.1 | 2361 | 2.8E+13 | 5851 | -3.7 | 6.6 | 406 |
| A9 | | | 4.2 | 0.375 | 0.01 | 3 | -2.9 | -8.8 | -13.8 | Good | Good | 28.0 | 2359 | 3.1E+13 | 6472 | -4.0 | 6.4 | 396 |
| A10 | | | 4.2 | 0.375 | 0.01 | 3 | -3.9 | -10.0 | -14.9 | Good | Good | 24.0 | 2357 | 3.1E+13 | 6466 | -4.3 | 6.2 | 380 |
| A11 (C.E.1) | 100 | 2.1 | 4.2 | 0.375 | 0.01 | 3 | 2.8 | -7.5 | -12.3 | Good | Good | 22.1 | 2368 | 2.3E+13 | 4820 | -5.5 | 6.5 | 381 |
| B1 | | | 4.2 | 0.375 | 0.01 | 3 | -2.4 | -3.4 | -6.5 | Good | Good | 28.3 | 2605 | 2.6E+13 | 5994 | -5.9 | 6.4 | 352 |
| B2 | | | 4.2 | 0.375 | 0.01 | 3 | -3.6 | -5.3 | -7.0 | Good | Good | 27.5 | 2633 | 2.4E+13 | 5592 | -6.1 | 6.3 | 346 |
| C1 | | | | 0.375 | 0.01 | 3 | 1.1 | -6.8 | -10.6 | Good | Good | 58.0 | 2375 | 3.3E+13 | 6936 | 0.3 | 6.9 | 488 |
| C2 | | | | 0.375 | 0.01 | 3 | 0.6 | -6.5 | -10.0 | Good | Good | 58.1 | 2374 | 3.3E+13 | 7703 | -4.1 | 7.1 | 501 |
| C3 | | | | 0.375 | 0.01 | 3 | 0.3 | -6.2 | -10.4 | Good | Good | 49.1 | 2381 | 3.7E+13 | 8850 | -3.9 | 7.3 | 506 |
| C4 | | | | 0.375 | 0.01 | 3 | -0.7 | -6.4 | -10.7 | Good | Good | 43.4 | 2374 | 4.2E+13 | 8824 | -4.0 | 7.2 | 486 |
| C5 | | | | 0.375 | 0.01 | 3 | -1.3 | -7.0 | -11.8 | Good | Good | 48.5 | 2368 | 4.2E+13 | 8586 | -3.0 | 6.8 | 472 |
| C6 | | | | | 0.01 | 3 | 0.9 | -6.8 | -10.5 | Good | Good | 62.0 | 2369 | 3.5E+13 | 7338 | -4.6 | 6.9 | 490 |
| C7 | | | | | 0.01 | 3 | 0.6 | -6.2 | -10.4 | Good | Good | 63.4 | 2377 | 4.2E+13 | 8835 | -4.1 | 7.2 | 505 |
| C8 | | | | | 0.01 | 3 | 0.3 | -6.3 | -10.3 | Good | Good | 49.5 | 2378 | 4.2E+13 | 8839 | -3.9 | 7.5 | 512 |
| C9 | | | | | 0.01 | 3 | -0.2 | -8.4 | -10.7 | Good | Good | 48.5 | 2361 | 4.3E+13 | 8985 | -3.9 | 7.1 | 500 |
| C10 | | | | | 0.01 | 3 | -1.1 | -6.9 | -11.5 | Good | Good | 52.1 | 2305 | 4.5E+13 | 9180 | -3.7 | 6.9 | 496 |
| D1 | | | | | | 3 | 1.6 | -7.2 | -12.0 | Good | Good | 32.1 | 2366 | 2.8E+13 | 5683 | -5.0 | 6.6 | 392 |
| D2 | | | | | | 3 | 1.3 | -7.1 | -11.4 | Good | Good | 48.9 | 2372 | 3.1E+13 | 6508 | -4.8 | 6.8 | 422 |
| D3 | | | | | | 3 | 0.0 | -6.7 | -10.8 | Good | Good | 60.3 | 2375 | 3.7E+13 | 7777 | -4.4 | 7.1 | 498 |
| D4 | | | | | | 3 | 0.6 | -6.4 | -10.2 | Good | Good | 69.0 | 2381 | 4.2E+13 | 8850 | -4.0 | 7.6 | 500 |
| D5 | | | | | | 3 | 0.3 | -6.3 | -10.3 | Good | Good | 69.3 | 2380 | 4.2E+13 | 8846 | -3.8 | 7.5 | 512 |
| D6 | | | | | | 3 | 0.4 | -6.4 | -10.7 | Good | Good | 55.3 | 2349 | 4.3E+13 | 8939 | -3.8 | 7.4 | 500 |
| D7 | | | | | | 3 | 0.4 | -6.8 | -11.4 | Good | Good | 48.6 | 2333 | 4.3E+13 | 8878 | -3.9 | 7.0 | 492 |
| D8 | | | | | | 3 | 0.8 | -7.0 | -12.0 | Good | Good | 32.7 | 2301 | 4.5E+13 | 9164 | -4.1 | 6.7 | 485 |
| D9 | | | | | | 3 | 0.6 | -7.4 | -12.5 | Good | Good | 30.5 | 2296 | 4.5E+13 | 9144 | -4.5 | 6.3 | 383 |
| E1 | | | | | | 3 | -0.2 | -9.9 | -14.7 | Good | Good | 62.1 | 2734 | 4.1E+13 | 9920 | -3.9 | 6.7 | 422 |
| E2 | | | | | | 3 | 0.5 | -8.4 | -13.2 | Good | Good | 50.4 | 2237 | 4.2E+13 | 8315 | -4.2 | 7.4 | 445 |
| E3 | | | | | | 3 | 0.8 | 22.0 | -33.2 | Poor | Poor | 7.2 | 3449 | 3.9E+13 | 11904 | 8.6 | 5.2 | 221 |
| E4 (C.E.2) | | | | | | 3 | 0.5 | 20.1 | -32.5 | Poor | Poor | 10.2 | 3125 | 4.3E+13 | 11873 | -9.3 | 5.5 | 220 |
| E5 | 100 | 2.5 | 3 | 0.375 | 0.01 | 3 | 0.8 | 18.2 | -27.4 | Poor | Poor | 11.5 | 3220 | 3.7E+13 | 10560 | -6.5 | 5.7 | 223 |
| E6 (C.E.3) | 100 | 2.5 | 2.8 | 0.375 | 0.01 | 3 | 0.5 | 17.7 | -27.0 | Poor | Poor | 22.3 | 3109 | 4.5E+13 | 12382 | -7.7 | 8.6 | 268 |
| E7 | | | | | | 3 | 0.5 | -12.9 | -19.2 | Poor | Poor | 49.2 | 2940 | 4.4E+13 | 11448 | -4.3 | 6.9 | 395 |

COMPARATIVE EXAMPLE 1

As shown in Table 1 and Table 2, the same procedure was followed as for the sample of Example 1, except for not performing calcination and firing using a mixed powder obtained by adding, to 100 moles of the main component $BaTiO_3$, 2.1 moles, converted to MgO, of $(MgCO_3)_4Mg(OH)_2 \cdot 5H_2O$, 0.375 moles of $MnCO_3$, 3.0 moles of $(Ba_{0.6}Ca_{0.4})SiO_3$, 0.01 mole of $V_2O_5$, and 2.1 moles of $Y_2O_3O$, to prepare a disk-shaped sample and a capacitor of Sample A11. These were tested in the same way as Example 1. The results are shown in Table 2.

EXAMPLE 2

As shown in Table 1, the same procedure was followed as in Example 1, except for using CaO or BaO as the first subcomponent and performing the calcination at a temperature of 1000° C., to prepare disk-shaped samples and capacitors of Sample B1 and B2. These were tested in the same way as Example 1. The results are shown in Table 2.

Note that when examining the molar ratio of specific components in the pre-calcination powder of (Ba+Ca)/(Ti+Y), as shown in Table 1, it was 1.021. Further, when examining the molar ratio (Ba+Y)/(Ti+Ca), as shown in Table 1, it was 0.9794.

EXAMPLE 3

As shown in Table 1, the same procedure was followed as in Example 1, except for further adding to the pre-calcination powder 2.1 moles of MgO and 2.1 moles of $Y_2O_3$ or further 0.375 mole of $MnCO_3$ and performing the calcination at a temperature of 700 to 1100° C., to prepare disk-shaped samples and capacitors of Samples C1 and C10. These were tested in the same way as Example 1. The results are shown in Table 2.

Note that when examining the molar ratio of specific components in the pre-calcination powder of (Ba+Mg)/(Ti+Y), as shown in Table 1, it was 0.9798. Further, when examining the molar ratio (Ba+Y)/(Ti+Mg), as shown in Table 1, it was 1.0206.

EXAMPLE 4

As shown in Table 1, the same procedure was followed as in Example 1, except for further adding to the pre-calcination powder 0.01 mole of $V_2O_5$ as a third subcomponent, 2.1 moles of $Y_2O_3$ as a fourth subcomponent, and 0.375 mole of $MnCO_3$ as a fifth subcomponent and performing the calcination at a temperature of 500 to 1300° C., to prepare disk-shaped samples and capacitors of Samples D1 to D9. These were tested in the same way as Example 1. The results are shown in Table 2.

Note that when examining the molar ratio of specific components in the pre-calcination powder of (Ba+Mg)/(Ti+Y), as shown in Table 1, it was 0.9798. Further, when examining the molar ratio (Ba+Y)/(Ti+Mg), as shown in Table 1, it was 1.0206.

EXAMPLE 5

As shown in Table 1, the same procedure was followed as in Example 4, except for, instead of the $Y_2O_3$ of the fourth subcomponent, including $Dy_2O_3$ or $Ho_2O_3$ in the pre-calcination powder in a content of 2.1 moles (number of moles of Dy or Ho of 4.2 moles, same below) and performing the calcination at a temperature of 800° C., to prepare disk-shaped samples and capacitors of Samples E1 and E2. These were tested in the same way as Example 1. The results are shown in Table 2.

Note that when examining the molar ratio of specific components in the pre-calcination powder of (Ba+Mg)/(Ti+Dy or Ho), as shown in Table 1, it was 0.9798. Further, when examining the molar ratio (Ba+Dy or Ho)/(Ti+Mg), as shown in Table 1, it was 1.0206.

EXAMPLE 6

As shown in Table 1, the same procedure was followed as in Example 4, except for, instead of the $Y_2O_3$ of the fourth subcomponent, including $Eu_2O_3$ in the pre-calcination powder in a content of 1.5 moles (number of moles of Eu of 3.0 moles, same below) and performing the calcination at a temperature of 800° C., to prepare a disk-shaped sample and capacitor of Sample E3. These were tested in the same way as Example 1. The results are shown in Table 2.

Note that when examining the molar ratio of specific components in the pre-calcination powder of (Ba+Mg)/(Ti+Eu), as shown in Table 1, it was 0.9951. Further, when examining the molar ratio (Ba+Eu)/(Ti+Mg), as shown in Table 1, it was 1.0049.

EXAMPLE 7

As shown in Table 1, the same procedure was followed as in Example 4, except for, instead of the $Y_2O_3$ of the fourth subcomponent, including $Gd_2O_3$ in the pre-calcination powder in a content of 1.5 moles (number of moles of Gd of 3.0 moles, same below) and performing the calcination at a temperature of 800° C., to prepare a disk-shaped sample and capacitor of Sample E5. These were tested in the same way as Example 1. The results are shown in Table 2.

Note that when examining the molar ratio of specific components in the pre-calcination powder of (Ba+Mg)/(Ti+Gd), as shown in Table 1, it was 0.9951. Further, when examining the molar ratio (Ba+Gd)/(Ti+Mg), as shown in Table 1, it was 1.0049.

COMPARATIVE EXAMPLE 2

As shown in Table 1 and Table 2, the same procedure was followed as for the sample of Example 7, except for not performing calcination and firing using a mixed powder obtained by adding, to 100 moles of the main component $BaTiO_3$, 2.5 moles, converted to MgO, of $(MgCO_3)_4Mg(OH)_2 \cdot 5H_2O$, 0.375 mole of $MnCO_3$, 3.0 moles of $(Ba_{0.6}Ca_{0.4})SiO_3$, 0.01 mole of $V_2O_5$, and 1.5 moles of $Gd_2O_3$, to prepare a disk-shaped sample and a capacitor of Sample E4. These were tested in the same way as Example 7. The results are shown in Table 2.

EXAMPLE 8

As shown in Table 1, the same procedure was followed as in Example 4, except for, instead of the $Y_2O_3$ of the fourth subcomponent, including $Tb_4O_7$ in the pre-calcination powder in a content of 0.7 mole (number of moles of Tb of 2.8 moles, same below) and performing the calcination at a temperature of 800° C., to prepare a disk-shaped sample and capacitor of Sample E7. These were tested in the same way as Example 4. The results are shown in Table 2.

Note that when examining the molar ratio of specific components in the pre-calcination powder of (Ba+Mg)/(Ti+Tb), as shown in Table 1, it was 0.9971. Further, when examining the molar ratio (Ba+Tb)/(Ti+Mg), as shown in Table 1, it was 1.0029.

COMPARATIVE EXAMPLE 3

As shown in Table 1 and Table 2, the same procedure was followed as for the sample of Example 8, except for not performing calcination and firing using a mixed powder obtained by adding, to 100 moles of the main component $BaTiO_3$, 2.5 moles, converted to MgO, of $(MgCO_3)_4Mg(OH)_2 \cdot 5H_2O$, 0.375 mole of $MnCO_3$, 3.0 moles of $(Ba_{0.6}Ca_{0.4})SiO_3$, 0.01 mole of $V_2O_5$, and 0.7 mole of $Tb_4O_7$, to prepare a disk-shaped sample and a capacitor of Sample E6. These were tested in the same way as Example 8. The results are shown in Table 2.

EXAMPLE 9

The same procedure was followed as in Example 1, except for including in the pre-calcination powder magnesium carbonate of the moles shown in Table 3, converted to MgO, with respect to 60 to 80 moles of $BaTiO_3$ and additionally adding not calcined main component and subcomponents to the calcined powder to give a wt % of the calcined powder of 60 to 80 wt % as shown in Table 4, to prepare disk-shaped samples and capacitors of Sample F1 to F3. These were tested in the same way as Example 1. The results are shown in Table 2.

Note that when examining the molar ratio of specific components in the pre-calcination powder of (Ba+Mg)/(Ti+Y), as shown in Table 1, it was 1.021. Further, when examining the molar ratio (Ba+Y)/(Ti+Mg), as shown in Table 1, it was 0.9794.

TABLE 3

| | Composition at time of calcination (mol) | | | | | | | | |
|---|---|---|---|---|---|---|---|---|---|
| Sample no. | Main comp. $BaTiO_3$ | 1st subcomp. | 3rd sub- comp. $V_2O_5$ | 4th subcomp. No. of moles of R alone | | 5th sub- comp. MnO | Formula (1) | Formula (2) | Cal. temp. T1 (° C.) |
| F1 | 60 | 1.26 | MgO | | | | 1.021 | 0.9794 | 1000 |
| F2 | 70 | 1.47 | MgO | | | | 1.021 | 0.9794 | 1000 |
| F3 | 80 | 1.68 | MgO | | | | 1.021 | 0.9794 | 1000 |
| G1 | 100 | 2.1 | MgO | 0.05 | Y | 0.375 | 0.9798 | 1.0206 | 900 |
| G2 | 100 | 2.1 | MgO | 0.07 | Y | 0.375 | 0.9798 | 1.0206 | 900 |
| G3 | 100 | 2.1 | MgO | 0.1 | Y | 0.375 | 0.9798 | 1.0206 | 900 |
| G4 | 100 | 2.1 | MgO | 0.5 | Y | 0.375 | 0.9798 | 1.0206 | 900 |
| H1 | 100 | 2.1 | MgO | 0.01 | Y | 0.375 | 0.9798 | 1.0206 | 900 |
| H2 | 100 | 2.1 | MgO | 0.01 | Y | 0.375 | 0.9798 | 1.0206 | 900 |
| H3 | 100 | 2.1 | MgO | 0.1 | Y | 0.375 | 0.9798 | 1.0206 | 900 |

Notes:
The first and fourth subcomponents are calculated as atomic %.
Formula (1): (Ba + first subcomponent)/(Ti + fourth subcomponent)
Formula (2): (Ba + fourth subcomponent)/(Ti + first subcomponent)

TABLE 4

| | Composition of components additionally added at time of making coating (mol) | | | | | | | | | | | |
|---|---|---|---|---|---|---|---|---|---|---|---|---|
| Sample no. | Main comp. $BaTiO_3$ | 1st sub- comp. MgO | 4th sub- comp. No. of moles of Y. | 5th sub- comp. MnO | 3rd sub- comp. $V_2O_5$ | 2nd sub- comp. (BaCa)Si$O_2$ | Cal- cined comp. wt % | TCC ΔC −55 (%) | ΔC +85 (%) | ΔC +125 (%) | B- char. | X7R |
| F1 | 40 | 0.84 | 4.2 | 0.375 | 0.01 | 3 | 60 | 2.6 | −7.5 | −12.3 | Good | Good |
| F2 | 30 | 0.63 | 4.2 | 0.375 | 0.01 | 3 | 70 | 1.8 | −7.5 | −12.0 | Good | Good |
| F3 | 20 | 0.42 | 4.2 | 0.375 | 0.01 | 3 | 80 | 0.9 | −7.2 | −11.7 | Good | Good |
| G1 | 0 | | | | | 3 | 100 | 0.5 | −6.2 | −9.7 | Good | Good |
| G2 | 0 | | | | | 3 | 100 | 0.5 | −6.2 | −9.4 | Good | Good |
| G3 | 0 | | | | | 3 | 100 | 0.7 | −5.9 | −8.7 | Good | Good |
| G4 | 0 | | | | | 3 | 100 | 0.6 | −4.2 | −7.1 | Good | Good |
| H1 | 0 | | | | | 3 (*1) | 100 | 0.4 | −6.5 | −11.5 | Good | Good |
| H2 | 0 | | | | | 3 (*2) | 100 | 0.6 | −7.4 | −11.9 | Good | Good |
| H3 | 0 | | | | | 3 (*3) | 100 | 0.5 | −6.3 | −9.3 | Good | Good |

TABLE 4-continued

| Sample no | HALT (hr) | er | IR | CR product | Change of capacity over time (%) | DC-bias capacity halving field (V/μm) | VB (V) |
|---|---|---|---|---|---|---|---|
| F1 | 22.0 | 2374 | 2.3E + 13 | 4832 | −5.3 | 6.5 | 365 |
| F2 | 25.0 | 2374 | 2.3E + 13 | 4832 | −4.3 | 6.7 | 383 |
| F3 | 27.9 | 2380 | 2.9E + 13 | 6108 | −4.6 | 6.9 | 403 |
| G1 | 71.4 | 2385 | 1.1E + 13 | 2322 | −3.8 | 7.5 | 488 |
| G2 | 88.5 | 2410 | 7.5E + 12 | 1600 | −3.6 | 7.4 | 465 |
| G3 | 105.0 | 2413 | 2.0E + 12 | 427 | −3.6 | 7.4 | 482 |
| G4 | 153.0 | 2377 | 8.7E + 11 | 183 | −3.9 | 7.1 | 411 |
| H1 | 60.5 | 2374 | 3.8E + 13 | 7984 | −3.8 | 7.3 | 430 |
| H2 | 46.3 | 2370 | 4.0E + 13 | 8390 | −3.8 | 7.3 | 440 |
| H3 | 101.6 | 2303 | 2.0E + 12 | 408 | −3.9 | 7.0 | 400 |

*1: $Li_2O$—$BaO$—$SiO_2$ (2:4:4)
*2: $B_2O_3$—$BaO$—$SiO_2$ (1:4.5:4.5)
*3: $Li_2O$—$BaO$—$SiO_2$ (4:2:4)

EXAMPLE 10

As shown in Table 3, the same procedure was followed as with Sample D5 of Example 4, except for changing the number of moles of $V_2O_5$ of the third subcomponent in the pre-calcination powder in the range of 0.05 to 0.5, to prepare disk-shaped samples and capacitors of Samples G1 to G4. These were tested in the same way as Example 4. The results are shown in Table 4.

Note that when examining the molar ratio of specific components in the pre-calcination powder of (Ba+Mg)/(Ti+Y), as shown in Table 3, it was 0.9798. Further, when examining the molar ratio (Ba+Y)/(Ti+Mg), as shown in Table 3, it was 1.0206.

EXAMPLE 11

The same procedure was followed as with Sample D5 of Example 4, except for making the number of moles of the $V_2O_5$ of the third subcomponent in the pre-calcination powder 0.01 or 0.1 and using a second subcomponent additionally added after calcination of the following composition, to prepare disk-shaped samples and capacitors of Samples H1 to H3. These were tested in the same way as Example 4. In Samples H1 and H3, as the second subcomponent, 3.0 moles of a mixed powder of $Li_2O$—$BaO$—$SiO_2$ (molar ratio: 2:4:4 or 4:2:4) was used. In Sample H2, as the second subcomponent, 3.0 moles of a mixed powder of $B_2O_3$—$BaO$—$SiO_2$ (molar ratio: 1:4.5:4.5) was used.

Note that when examining the molar ratio of specific components in the pre-calcination powder of (Ba+Mg)/(Ti+Y), as shown in Table 3, it was 0.9798. Further, when examining the molar ratio (Ba+Y)/(Ti+Mg), as shown in Table 3, it was 1.0206.
Evaluation As shown in Tables 1 to 4, it could be confirmed that all of the examples of the present invention could satify the X7R characteristic and B characteristic. Further, when comparing Comparative Example 1, that is, Sample A11, and the examples of the present invention, that is, Samples A1 to A10, B1, B2, C1 to C10, and D1 to D9, it could be confirmed that the examples of the invention were longer in HALT (IR lifetime), higher in CR product, smaller in change of electrostatic capacity over time under a DC electric field, and higher in capacity halving field under a DC electric field.

Further, when comparing for example the comparative example of Sample A11 and the examples of the invention of Samples D2 to D5, it could be confirmed that the breakdown voltage could be improved by suitably selecting the composition of the pre-calcination powder and calcination temperature.

Further, when examining the results of Samples C1 to C10 and D1 to D9, it could be confirmed that the calcination temperature is preferably from 500° C. to less than 1200° C., more preferably 600 to 900° C. when the pre-calcination powder includes the fourth subcomponent. Further, when examining the results of Samples A1 to A10, it could be confirmed that the calcination temperature is preferably 600 to 1300° C., more preferably 900 to 1300° C., still more preferably 1000 to 1200° C. when the pre-calcination powder does not include the material of the fourth subcomponent. In these temperature ranges, the HALT (IR lifetime) was particularly improved.

Further, when comparing Samples A1 to A10 and D1 to D9, it could be confirmed that the HALT (IR lifetime) and breakdown voltage characteristic were particularly improved under molar ratios of specific components in the pre-calcination powder of a (Ba+metal element of first subcomponent)/(Ti+metal element of fourth subcomponent) of less than 1 and a (Ti+metal element of fourth subcomponent)/(Ba+metal element of first subcomponent) of over 1.

Still further, when comparing Samples F1 to F3, it could be confirmed that it is preferable that the pre-calcination powder be at least 60 wt %, more preferably at least 70 wt %, if possible at least 80 wt %, with respect to the dielectric material as a whole as 100 wt %. It could be confirmed that the greater the ratio of the calcined powder, the more improved the properties.

Further, when examining the results of Samples E3 to E7, it could be confirmed that even when using a Tb oxide or Gd oxide as the fourth subcomponent, due to the calcination method of the present invention, while the X7R characteristic was not satisfied, the other various properties (in particular the IR lifetime) was improved.

Further, when examining Samples G1 to G4 etc., it could be confirmed that by making the ratio of the third subcomponent 0.01 to 0.1 mole, preferably 0.01 to less than 0.1 mole, the insulation resistance (IR), CR product, breakdown voltage (VB) characteristic, and resistance to drop in capacity under DC bias (DC-Bias characteristic) were improved.

Further, when examining Samples H1 to H3 etc., it could be confirmed that the effects of the present invention could be obtained even when using $SiO_2$, $Li_2O$, $BaO$, etc. as the second subcomponent.

While the invention has been described with reference to specific embodiments chosen for purpose of illustration, it should be apparent that numerous modifications could be made thereto by those skilled in the art without departing from the basic concept and scope of the invention.

What is claimed is:

1. A method of production of a dielectric, ceramic composition having at least a main component expressed by a formula $Ba_mTiO_{2+n}$, wherein m is $0.995 \leq m \leq 1.010$, n is $0.995 \leq n \leq 1.010$, and the ratio of Ba and Ti is $0.995 \leq Ba/Ti \leq 1.010$, a first subcomponent containing at least one compound selected from MgO, CaO, BaO, SrO, and $Cr_2O_3$, a second subcomponent containing at least one compound selected from $SiO_2$, MO (where M is at least one element selected from Ba, Ca, Sr, and Mg), $Li_2O$, and $B_2O_3$, a third subcomponent containing at least one compound selected from $V_2O_5$, $MoO_3$, and $WO_3$ and a fourth subcomponent containing an oxide of R (where R is at least one element selected from Y, Dy, Td, Gd, and Ho), wherein the molar ratio of the subcomponents with respect to 100 moles of the main component is first subcomponent: 0.1 to 3, second subcomponent: 2 to 12, third subcomponent: 0.01 to 3, fourth subcomponent: 0.1 to 10.0 (where, in the ratio, the number of moles of the fourth subcomponent is the number of moles of R alone), said method of producing the dielectric ceramic composition comprising the steps of:

mixing, in said main component, at least part of other subcomponents except for said second subcomponent to prepare a pre-calcination powder, calcining the pre-calcination powder to prepare a calcined powder, and mixing at least said second subcomponent in said calcinated powder to obtain the dielectric ceramic composition having molar ratios of the subcomponents to the main component of the above ratios.

2. The method of production of a dielectric ceramic composition as set forth in claim 1, said dielectric ceramic composition further containing a fifth subcomponent containing MnO and having a molar ratio of the fifth subcomponent to 100 moles of the main component of 0.05 to 1.0.

3. The method of production of a dielectric ceramic composition as set forth in claim 2, said dielectric ceramic composition having a molar ratio of the third subcomponent to 100 moles of the main component of 0.01 to 0.1.

4. The method of production of a dielectric ceramic composition as set forth in claim 2, wherein the pre-calcination powder is prepared so that the molar ratios of components contained in the pre-calcination powder (Ba+metal element of the first subcomponent)/(Ti+metal element of the fourth subcomponent) is less than 1, or (Ba+metal element of the fourth subcomponent)/(Ti+metal element of the first subcomponent) is over 1, and calcination is performed.

5. The method of production of a dielectric ceramic composition as set forth in claim 2, wherein the first subcomponent is always contained in the pre-calcination powder when preparing the pre-calcination powder.

6. The method of production of a dielectric ceramic composition as set forth in claim 2, wherein the pre-calcination powder is calcined at a temperature of 500°C. to less than 1200°C.

7. The method of production of a dielectric ceramic composition as set forth in claim 6, wherein the calcination is performed for a plurality of times.

8. The method of production of a dielectric ceramic composition as set forth in claim 2, wherein a mean particle size of the main component is 0.1 to 0.7 μm.

9. The method of production of a dielectric ceramic composition as set forth in claim 2, wherein at least 70 wt % of the calcined powder is used with respect to the entire dielectric material as 100 wt %.

10. A method of production of an electronic device containing dielectric layers comprising forming dielectric layers by using the dielectric ceramic composition obtained by the method set forth in claim 2.

11. The method of production of a dielectric ceramic composition as set forth in claim 1, said dielectric ceramic composition having a molar ratio of the third subcomponent to 100 moles of the main component of 0.01 to 0.1.

12. The method of production of a dielectric ceramic composition as set forth in claim 1, wherein the pre-calcination powder is prepared so that the molar ratios of components contained in the pre-calcination powder (Ba+metal element of the first subcomponent)/(Ti+metal element of the fourth subcomponent) is less than 1, or (Ba+metal element of the fourth subcomponent)/(Ti+metal element of the first subcomponent) is over 1, and calcination is performed.

13. The method of production of a dielectric ceramic composition as set forth in claim 1, wherein the first subcomponent is always contained in the pre-calcination powder when preparing the pre-calcination powder.

14. The method of production of a dielectric ceramic composition as set forth in claim 1, wherein the pre-calcination powder is calcined at a temperature of 500°C. to less than 1200°C.

15. The method of production of a dielectric ceramic composition as set forth in claim 14, wherein the calcination is performed for a plurality of times.

16. The method of production of a dielectric ceramic composition as set forth in claim 1, wherein a mean particle size of the main component is 0.1 to 0.7 μm.

17. The method of production of a dielectric ceramic composition as set forth in claim 1, wherein at least 70 wt % of the calcined powder is used with respect to the entire dielectric material as 100 wt %.

18. A method of production of an electronic device containing dielectric layers comprising forming dielectric layers by using the dielectric ceramic composition obtained by the method set forth in claim 1.

19. A method of production of a multilayer ceramic capacitor comprised by alternately stacking interal electrodes comprised of Ni or Ni alloy and dielectric layers, where each of dielectric layers contains, in the molar ratios indicated, $BaTiO_3$: 100, at least one of MgO and CaO: 0.1 to 3, MnO: 0.05 to 1.0, $Y_2O_3$: 0.1 to 5, $V_2O_5$: 0.01 to 3, and $Ba_aCa_{1-a}SiO_3$ (where the symbol (a) is a number from 0 to 1): 2 to 12, said method comprising: premixing in $BaTiO_3$ at least one of MgO, CaO and a compound forming MgO or CaO upon heat treatment, pre-calcinating the premixture at a temperature of 900° C. to 1300° C., and using the pre-calcinated premixture to form the dielectric layers, wherein the pre-calcinated premixture forms at least 70 wt % of the dielectric layers.

20. The method of production of a multilayer ceramic capacitor as set forth in claim 19, wherein a mean particle size of the main component is 0.2 to 0.7 µm.

21. A method of production of a multilayer ceramic capacitor comprised by alternately stacking interal electrodes comprised of Ni or Ni alloy and dielectric layers, where each of dielectric layers contains, in the molar ratios indicated, $BaTiO_3$: 100, at least one of MgO and CaO: 0.1 to 3, MnO: 0.05 to 1.0, $Y_2O_3$: 0.1 to 5, $V_2O_5$: 0.01 to 3, and $Ba_aCa_{1-a}SiO_3$ (where the symbol (a) is a number from 0 to 1): 2 to 12, said method comprising: premixing in $BaTiO_3$ at least one of MgO, CaO and a compound forming MgO or CaO upon heat treatment, MnO or a compound forming MnO upon heat treatment, $Y_2O_3$ or a compound forming $Y_2O_3$ upon heat treatment, and $V_2O_5$ or a compound forming $V_2O_5$ upon heat treatment, pre-calcinating the premixture at a temperature of 900°C. to 1300°C., and using the pre-calcinated premixture to form the dielectric layers, wherein the pre-calcinated premixture forms at least 70 wt % of the dielectric layers.

22. The method of production of a multilayer ceramic capacitor as set forth in claim 20, wherein a mean particle size of the main component is 0.2 to 0.7 µm.

* * * * *